(12) United States Patent
Ransone

(10) Patent No.: US 8,424,949 B2
(45) Date of Patent: Apr. 23, 2013

(54) MOTORCYCLE WITH WIND DEFLECTORS MOUNTED ON THE OUTBOARD SIDES OF THE MOTORCYCLE FORK ASSEMBLY FOR DEFLECTING ONCOMING WIND

(76) Inventor: Ralph Alexander Ransone, Raleigh, NC (US)

(*) Notice: Subject to any disclaimer, the term of this patent is extended or adjusted under 35 U.S.C. 154(b) by 0 days.

(21) Appl. No.: 13/328,059

(22) Filed: Dec. 16, 2011

(65) Prior Publication Data

US 2012/0267911 A1   Oct. 25, 2012

Related U.S. Application Data

(60) Provisional application No. 61/477,843, filed on Apr. 21, 2011.

(51) Int. Cl.
*B62J 17/02* (2006.01)
(52) U.S. Cl.
USPC .................................. 296/78.1; 280/288.2
(58) Field of Classification Search ............... 296/78.1, 296/180.1, 91, 95.1, 96.11, 84.1; 280/288.2; B62J 17/02
See application file for complete search history.

(56) References Cited

U.S. PATENT DOCUMENTS

| | | | | |
|---|---|---|---|---|
| 4,010,976 A * | 3/1977 | Shields | | 296/78.1 |
| 4,130,315 A * | 12/1978 | Shields | | 296/78.1 |
| 4,136,890 A * | 1/1979 | Vertucci | | 296/78.1 |
| 4,515,405 A * | 5/1985 | Ogishima | | 296/78.1 |
| 4,536,005 A * | 8/1985 | Tanaka et al. | | 296/78.1 |
| 5,267,767 A * | 12/1993 | Farrow | | 296/78.1 |
| 5,658,035 A * | 8/1997 | Armstrong | | 296/78.1 |
| 5,704,679 A * | 1/1998 | Sodo | | 296/78.1 |
| 5,853,216 A * | 12/1998 | Barg | | 296/78.1 |
| 5,997,070 A * | 12/1999 | Matsuo et al. | | 296/78.1 |
| 6,042,171 A * | 3/2000 | Hesse | | 296/78.1 |
| 6,231,104 B1 * | 5/2001 | Roethel | | 296/78.1 |
| 7,137,722 B2 * | 11/2006 | Uemoto et al. | | 362/473 |
| 7,178,858 B1 * | 2/2007 | Hesse | | 296/180.1 |
| 7,325,853 B2 * | 2/2008 | Tsukui et al. | | 296/78.1 |
| 7,611,186 B2 * | 11/2009 | Metzikis | | 296/78.1 |
| 8,136,865 B1 * | 3/2012 | Beck | | 296/136.08 |
| 2006/0023462 A1 * | 2/2006 | Uemoto et al. | | 362/475 |
| 2006/0087144 A1 * | 4/2006 | Kamimura et al. | | 296/78.1 |

* cited by examiner

*Primary Examiner* — Glenn Dayoan
*Assistant Examiner* — Pinel Romain
(74) *Attorney, Agent, or Firm* — Coats & Bennett, P.L.L.C.

(57) ABSTRACT

A motorcycle having a fork assembly, left and right forks and an upper fairing is provided with left and right wind deflectors mounted adjacent to the outboard sides of the left and right forks. The wind deflectors project downwardly from a lower edge of the upper fairing. This strategic placement of the left and right wind deflectors prevents oncoming wind from passing immediately adjacent the outboard sides of the left and right forks and passing underneath the lower edge of the upper fairing and hitting the motorcycle rider especially in the chest and helmet areas.

13 Claims, 7 Drawing Sheets

MOTORCYCLE WITH WIND DEFLECTORS MOUNTED ON THE OUTBOARD SIDES OF THE MOTORCYCLE FORK ASSEMBLY FOR DEFLECTING ONCOMING WIND

CROSS-REFERENCE TO RELATED APPLICATION

This application claims priority under 35 U.S.C. §119(e) from the following U.S. provisional patent application: Application Ser. No. 61/477,843 filed Apr. 21, 2011, which is expressly incorporated in its entirety by reference herein.

FIELD OF THE INVENTION

The present invention relates to motorcycles and wind deflectors and more particularly to a motorcycle having wind deflectors.

BACKGROUND OF THE INVENTION

People of all ages enjoy the pleasures of riding motorcycles. In recent years, manufacturers of many motorcycles have devoted substantial attention and resources to designing comfort into the motorcycles. Now there are many makes and types of motorcycles available to enable riders to ride long distances, even cross-country, comfortably.

One particular area of motorcycle design that has received attention over the years is in the area of wind deflection. For example, some motorcycles are now provided with upper and lower front fairings that deflect some, but not all, of the oncoming wind. This in turn reduces the amount of wind impacting the rider. However, the design of motorcycles, particularly the frontal area including the front fork assembly, has made it difficult to design fairings and wind deflectors that block or deflect most oncoming air. As discussed above, some motorcycles employ both upper and lower fairings. Between these two fairings is an open space and this permits oncoming wind to enter the open space between the upper and lower fairings, and move under the lower edge of the upper fairing and impact the chest, face and helmet areas of the rider. This adversely affects the rider. In the summertime it increases the heat exposed to the rider and in the wintertime it increases the rider's exposure to cold air. In addition, this increases rider fatigue and decreases the rider's visibility due to helmet and eyeglasses moving or vibrating (buffeting). In addition, this oncoming wind increases exposure to rain, bugs, and road debris.

Blocking or deflecting wind in the area between the upper and lower fairings is challenging. This is because the front fork assembly must turn between extreme positions, sometimes referred to as lock-to-lock. Therefore, any type of wind deflector secured in this area to any part of the fork assembly must not interfere with other structural elements of the motorcycle. This can be a problem when attempting to position wind deflectors underneath an upper fairing, for example. Wind deflectors positioned in this area and secured to the front fork assembly tend to impact or hit other portions of the motorcycle such as a crash bar or lower fairing when the fork assembly is turned to an extreme position.

Therefore, there has been and continues to be a need for wind deflectors for a motorcycle that are positioned immediately below the upper fairing and which are effective at blocking or deflecting oncoming wind in areas around the outboard sides of the fork assembly. This prevents oncoming wind or air from passing underneath the lower edge of the upper fairing and impacting the chest, face and helmet areas of the rider.

SUMMARY OF THE INVENTION

The present invention entails a motorcycle that is provided with left and right laterally spaced wind deflectors that assume a space generally below an upper fairing. The left and right wind deflectors generally block or deflect some of the oncoming air and prevent the oncoming air from passing below the lower edge of the upper fairing and impacting the rider.

In one embodiment, the left and right wind deflectors are mounted to the fork assembly of the motorcycle and turn with the fork assembly. Left and right forks comprise a part of the fork assembly and the left wind deflector is mounted to the left fork and projects outwardly therefrom. The right wind deflector is mounted to the right fork and projects outwardly therefrom. Thus, the left and right wind deflectors tend to deflect oncoming wind that in the absence of the wind deflectors would pass immediately adjacent the outboard sides of the left and right forks and then pass underneath the lower edge of the upper fairing which would result in the oncoming air or wind impacting the rider.

Other objects and advantages of the present invention will become apparent and obvious from a study of the following description and the accompanying drawings which are merely illustrative of such invention.

DETAILED DESCRIPTION

With further reference to the drawings, a motorcycle is shown therein and indicated generally by the numeral 10. As will be discussed in more detail subsequently herein, incorporated into the motorcycle 10 is a pair of wind deflectors 12A and 12B. Wind deflector 12A is referred to as a right wind deflector and wind deflector 12B is referred to as a left wind deflector.

Figure 4:
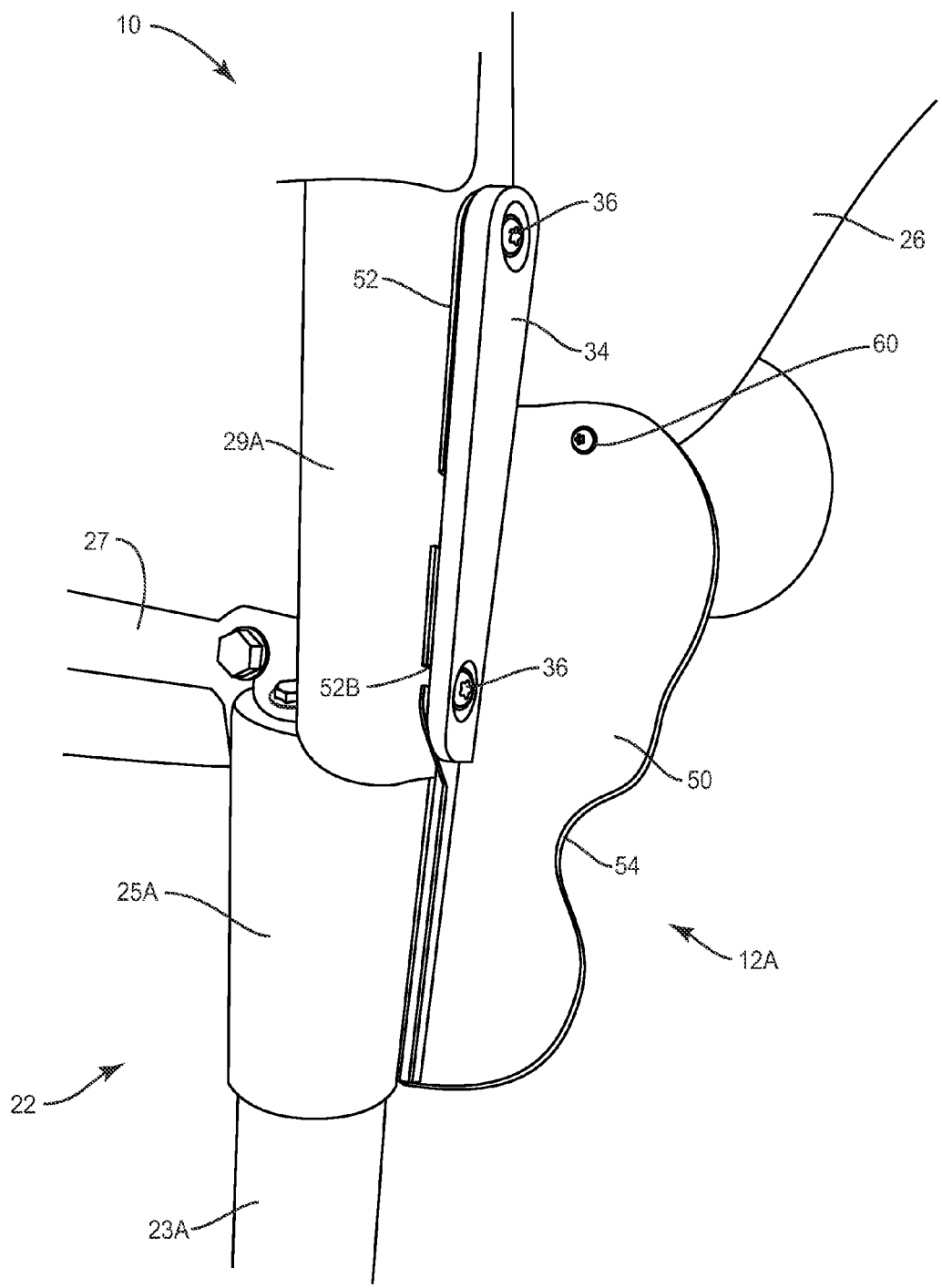
FIG. 4 is a fragmentary perspective view showing how the right wind deflector is mounted to the motorcycle.
Figure 5:
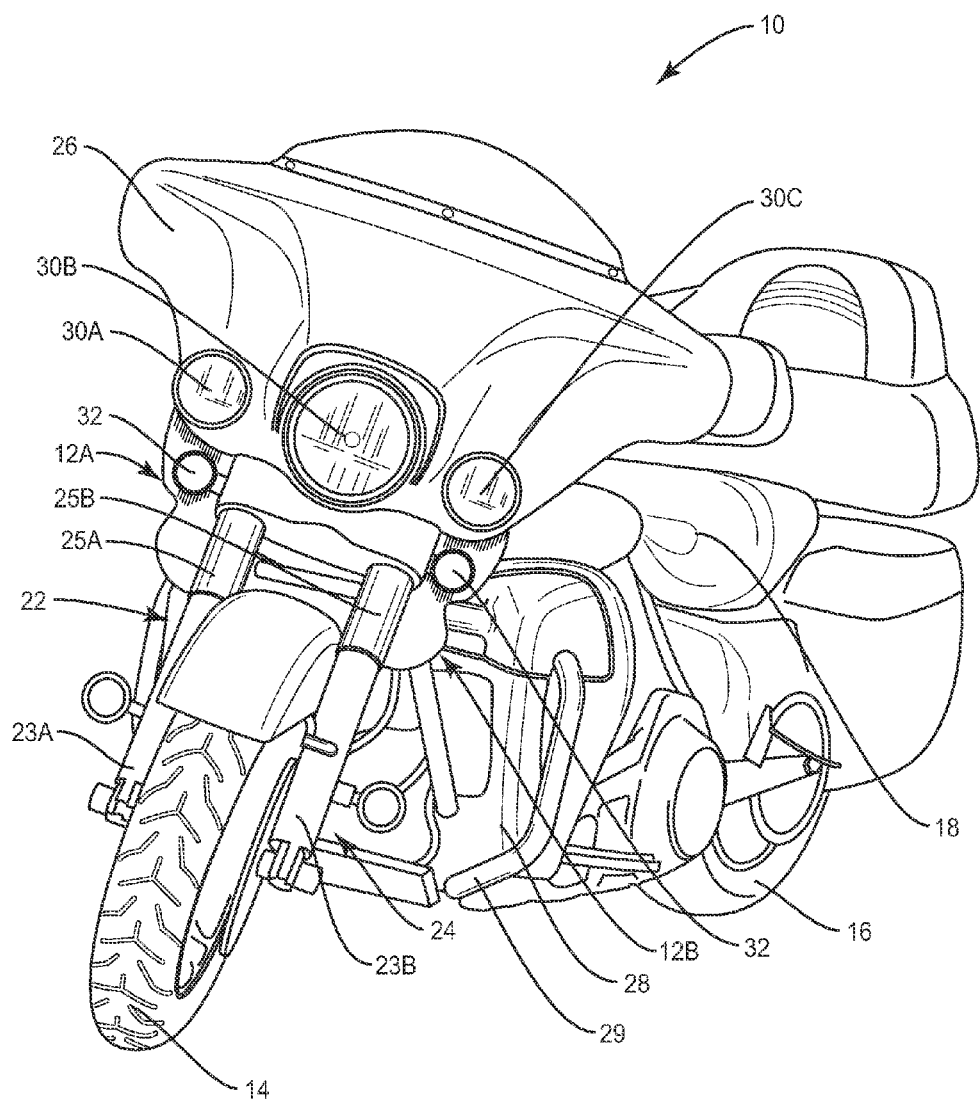
FIG. 5 is a perspective view of the motorcycle from the front and to one side showing the wind deflectors incorporated therein.
Figure 6:
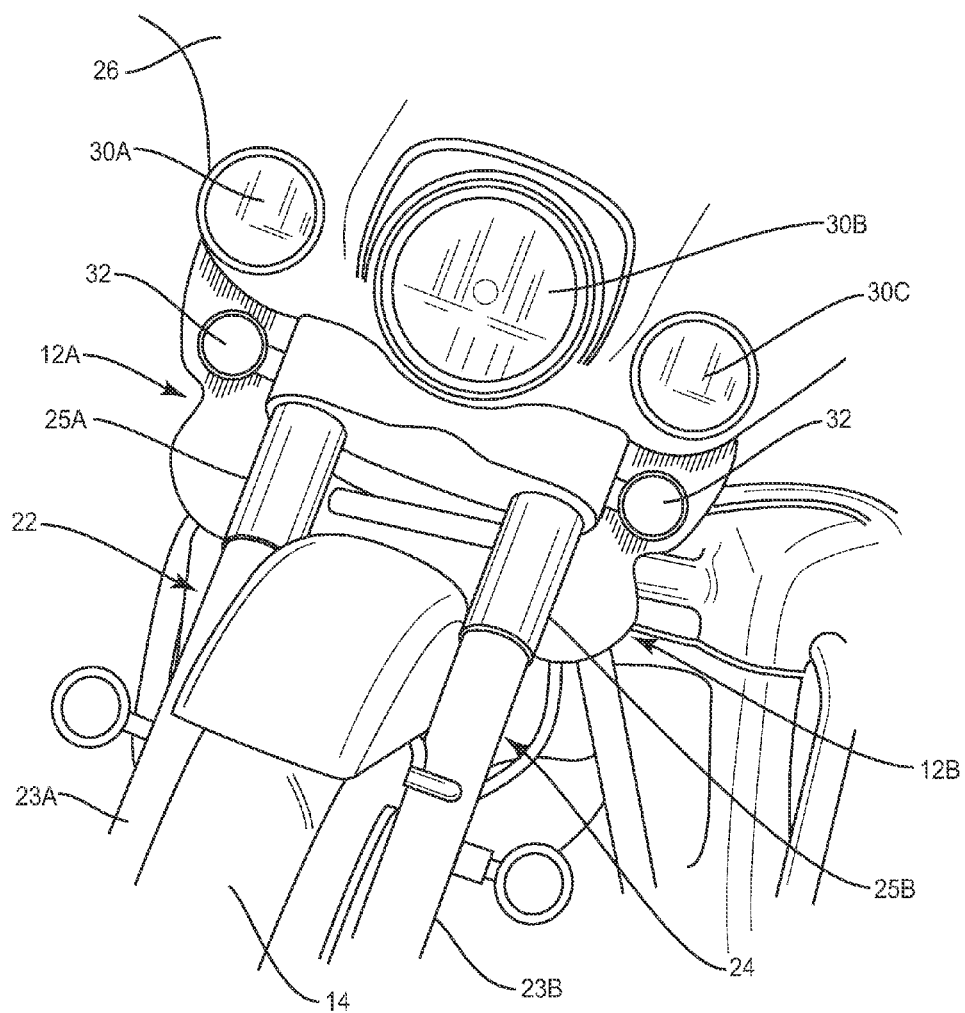
FIG. 6 is a fragmentary perspective view of a portion of a motorcycle showing the wind deflectors.

Motorcycle 10 can be of various makes and types. Motorcycle 10 includes a frame structure that is supported by front and rear wheels 14 and 16. A seat 18 is provided. Motorcycle 10 includes a set of handlebars 20 that are operatively connected to a front fork assembly. The fork assembly is of a conventional design and includes a right fork indicated generally by the numeral 22 and a left fork indicated generally by the numeral 24. See FIG. 1. The right fork 22 includes a lower member 23A and a right slide cover 25A. The left fork 24 includes a lower member 23B and a left slide cover 25B. In addition, the fork assembly includes an upper structure that functions as a mounting structure for mounting the wind deflectors 12A and 12B. A portion of this upper structure is shown in FIG. 4. The upper structure of the fork assembly includes a structure that is commonly referred to as a triple tree assembly. The triple tree assembly includes a lower triple tree which is shown in FIG. 4 and designated by the numeral 27. An upper triple tree that forms a part of this upper support structure is typically disposed above the lower triple tree 27 and is not particularly shown in FIG. 4. Also disposed on each side of the fork assembly about the upper portion thereof is a side cover. In the case of the right side of the fork assembly as shown in FIG. 4, the side cover is shown and designated by 29A. Details of the fork assembly are not dealt with herein because such is not material to the present invention and because the fork assembly shown herein is of a conventional design that is found on some models of HARLEY DAVIDSON motorcycles. However, it is appreciated that the fork assembly is of a general telescoping design that effectively cushions the ride of the motorcycle when the motorcycle encounters bumps and undulations in the surface being traveled. Therefore, the lower members 23A and 23B of the fork assembly will move with respect to the right slide cover 25A and the left slide cover 25B.

Motorcycle 10 also includes an upper fairing 26 that is secured to the motorcycle 10 in such a manner that the handlebars 20, fork assembly, and the upper fairing 26 move together. To further prevent or reduce the amount of air or oncoming wind impacted on the rider, the motorcycle 10 in one exemplary embodiment includes a lower fairing 28 on the front of each side of the motorcycle. In addition, on each side of the motorcycle 10 about a front portion thereof is a crash bar or engine guard indicated by the numeral 29.

Figure 1:
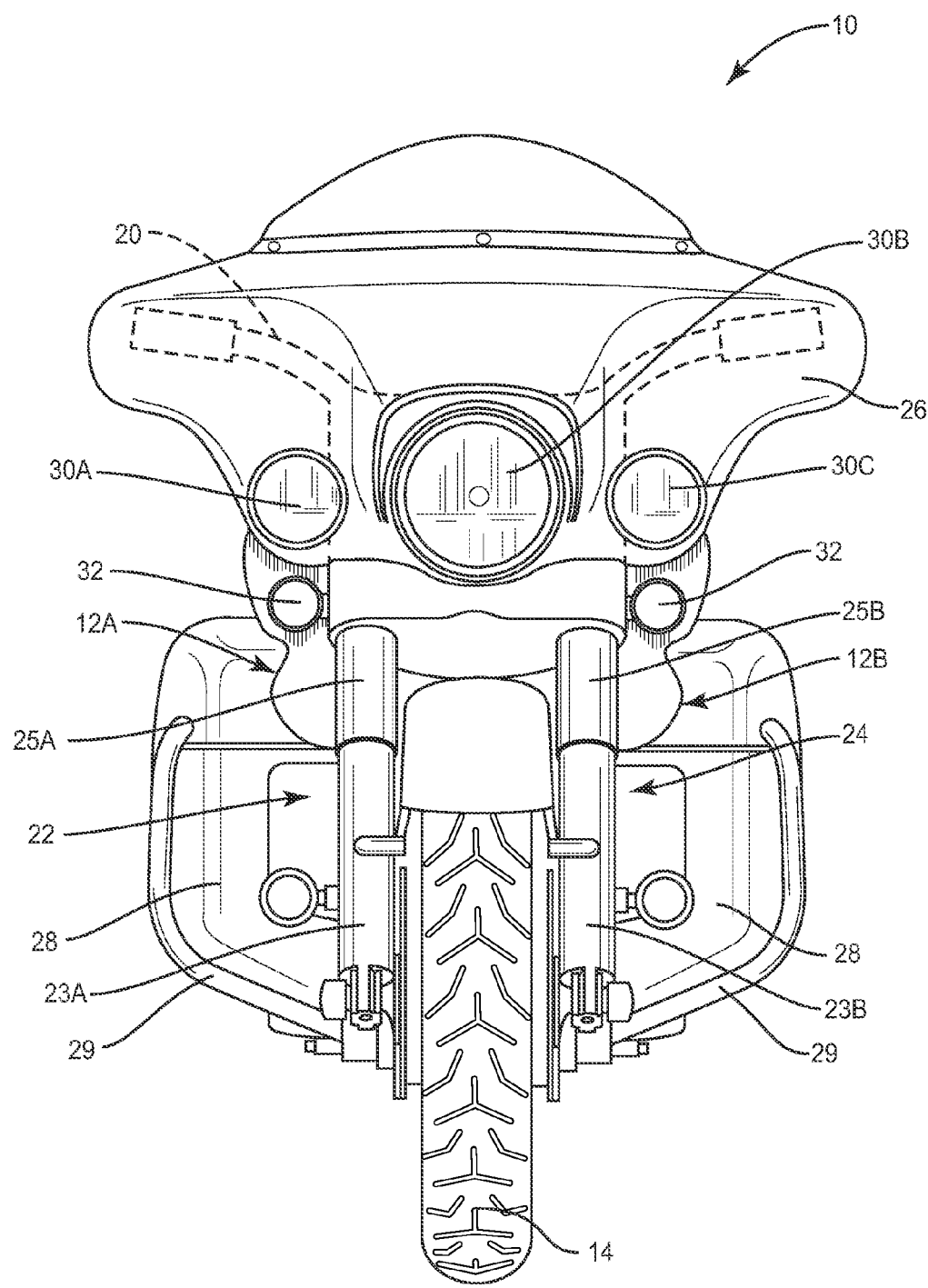
FIG. 1 is a front elevational view of a motorcycle having the wind deflectors of the present invention incorporated therein.

As seen in FIG. 1, the motorcycle 10 includes a series of headlights, 30A, 30B, and 30C. In the embodiment illustrated herein, the motorcycle 10 includes a pair of bullet-style turn signals 32. In order to mount or secure the bullet-style turn signals 32 to the motorcycle 10, there is provided a mounting bracket 34, as best seen in FIG. 4, which secures a headlight support structure that in turn supports the bullet-style turn signals 32. Mounting bracket 34 is secured to the upper structure of the fork assembly by a pair of fasteners 36. See FIG. 4. As will be appreciated from subsequent portions of the disclosure, the mounting bracket 34 shown in FIG. 4 is utilized to secure the wind deflectors 12A and 12B to the motorcycle 10 and more particularly to the upper structure of the fork assembly which in one embodiment would include portions of the triple tree structures.

Figure 2:
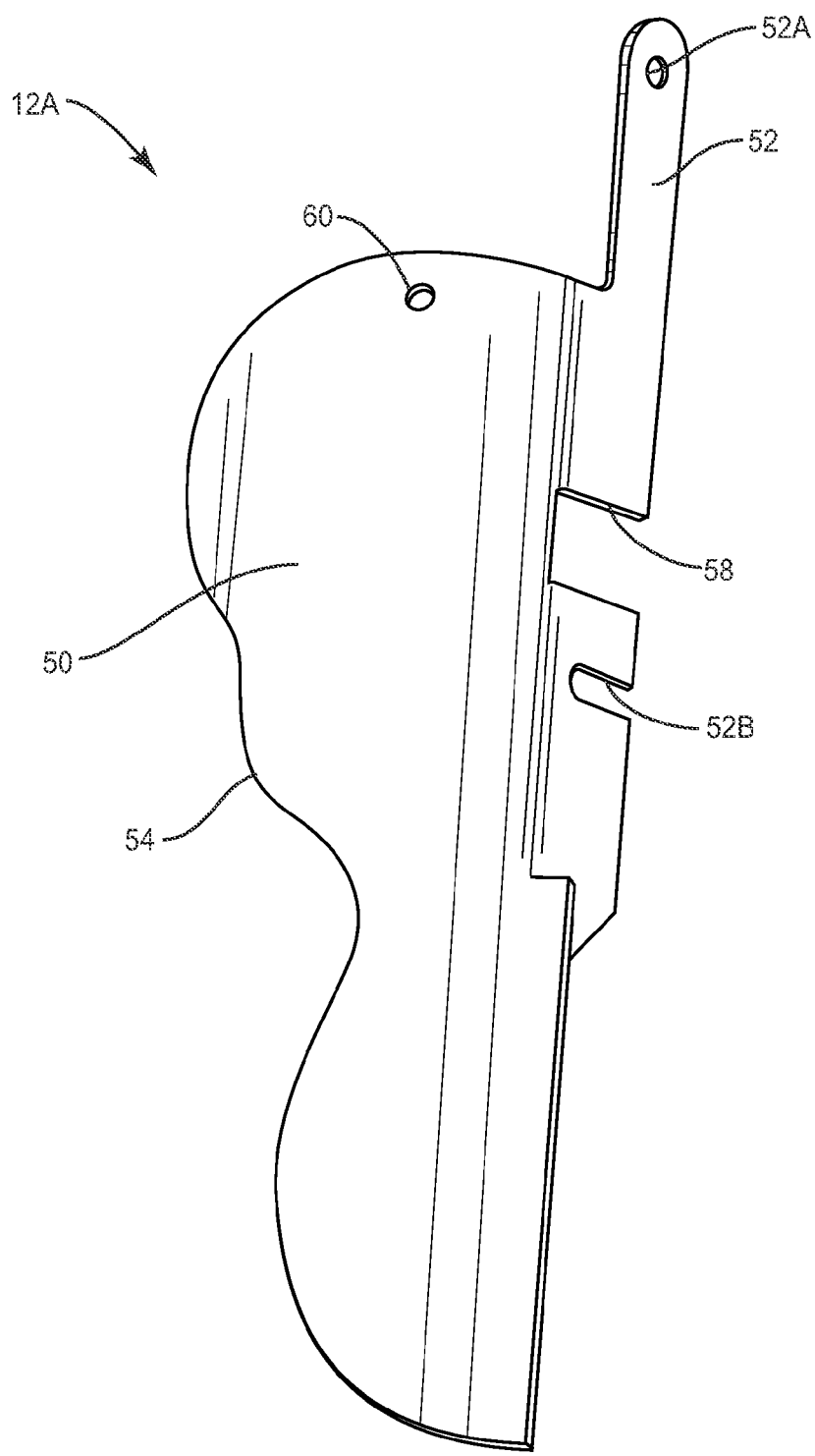
FIG. 2 is a perspective view of one of the wind deflectors.
Figure 3:
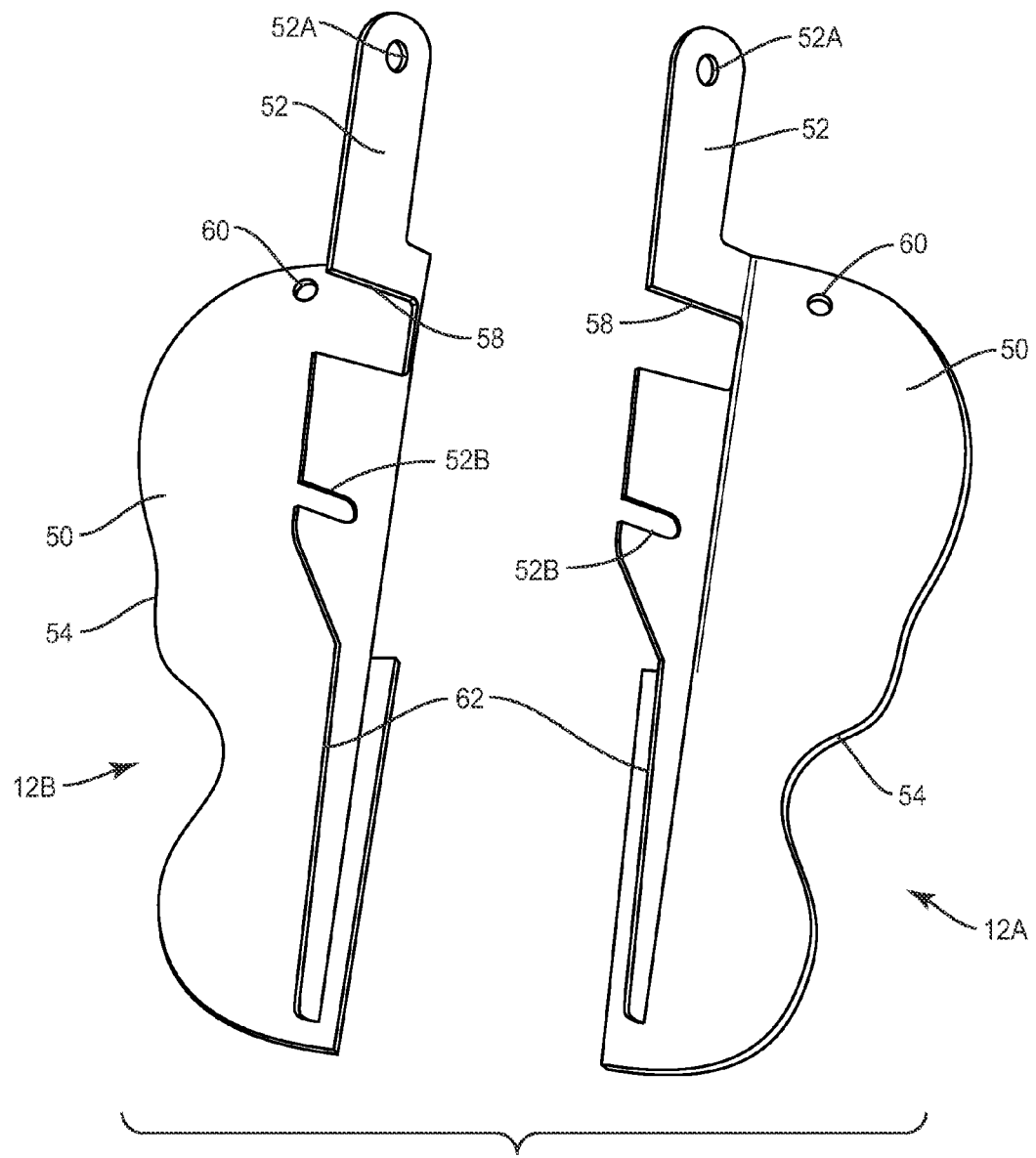
FIG. 3 is a perspective view of the left and right wind deflectors.

Attention is directed to FIGS. 2 and 3 which show details of the wind deflectors 12A and 12B. It should be pointed out that the wind deflectors can be constructed of various suitable materials including light gauge steel, plastic, or composites. In some cases the wind deflectors can be constructed of non-ferrous materials, for example plastic, fiberglass, Kevlar, or other similar materials. The wind deflector may be manufactured by stamping, drilling, welding or bending light steel or the wind deflectors can be cast in their near final form and machined to certain specifications. As will become apparent from a full understanding of the present invention, the shape of each wind deflector should be carefully designed and laid out before fabrication. This, in a preferred embodiment, will tend to maximize the effective frontal area of the deflector while still allowing a clearance when the deflectors are rotated with the handlebars 20 when the motorcycle is being steered or parked, with the handlebars 20 in their extreme position, lock-to-lock.

Figure 7:
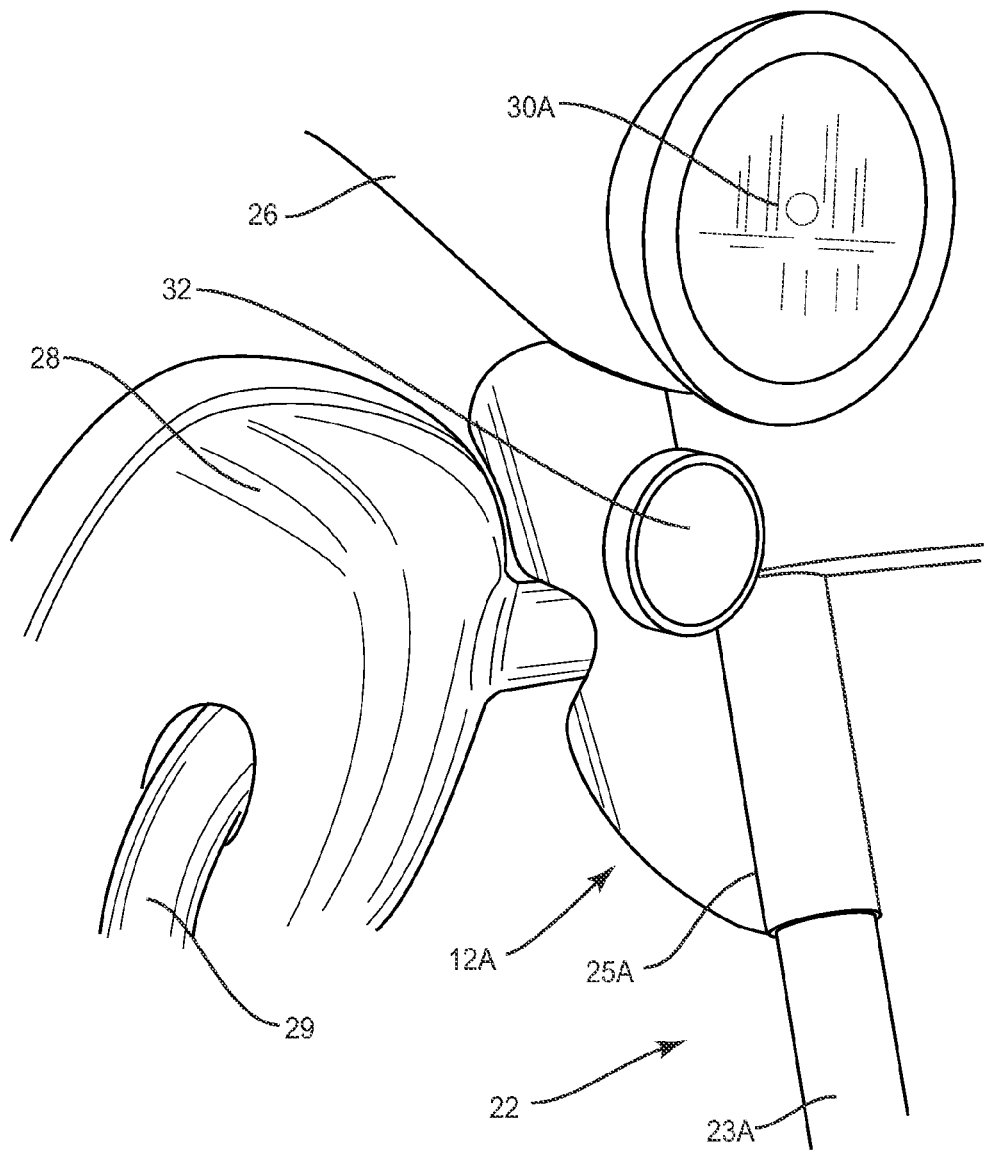
FIG. 7 is a fragmentary perspective view illustrating how one of the wind deflectors clears the lower fairing or crash bar when the handlebars are turned to an extreme position.

Each wind deflector includes a main body 50. Secured adjacent the main body is a mounting flange 52 that is turned at an angle with respect to the main body. Formed in the mounting flange 52 is a bolt opening 52A and a bolt opening cutout 52B. As will be discussed later, each wind deflector 12A or 12B is secured to the motorcycle by sandwiching the mounting flange 52 between or to a respective side cover (see the right side cover 29A in FIG. 4) and the mounting bracket 34 as shown in FIG. 4. Continuing to refer to the basic design of the wind deflector, the same includes an outer terminal edge 54. Note that the outer terminal edge 54 is specifically contoured such that when the handlebars 20 are turned to an extreme position, the wind deflector will clear parts of the motorcycle structures such as the lower fairing 28 or the crash bar 29. See FIG. 7, for example. In the example illustrated herein, each wind deflector is provided with a headlight support structure cutout 58. That is, a support bar or bracket that, in the example illustrated, supports the bullet-shaped turn signals 32 and passes through the mounting flange and particularly through the cutout 58.

Each wind deflector 12A or 12B is designed to be securely attached to the upper fairing 26. Therefore, as shown in FIGS. 2, 3 and 4, formed in the upper portion of the main body 50 is a fastener opening 60. This enables a fastener to be extended through fastener opening 60 and through an opening in the upper fairing 26 so as to securely attach the upper portion of each wind deflector to the upper fairing. To provide additional structural strength to each wind deflector 12A or 12B, there is provided a reinforcing rib 62 that extends downwardly from the mounting flange 52 and which is integrated into the main body 50 of the wind deflector. Each wind deflector will preferably have a finish applied to it to protect the material from impact damage from corrosion, road debris, bugs, etc. All bends in the material that comprise the wind deflector are made to affect a tight fit between the wind deflector and the motorcycle components.

As shown in FIG. 4, the right wind deflector 12A is secured to the motorcycle 10 by sandwiching the mounting flange 52 between the right side cover 29A and the attaching bracket 34. Note that fasteners 36 extend through the mounting bracket 34 and through portions of the mounting flange 52 and through the right side cover 29A. In addition, the fasteners 36 extend into and connect with the upper structure of the fork assembly. In particular, the lower fastener 36 shown in FIG. 4 extends into and connects to the lower triple tree 27. The upper fastener 36 extends into and connects to an upper triple tree (not shown). Because of the cutout 52B formed in the mounting flange 52, the sweep angle of the wind deflector 12A can be adjusted. Note also in FIG. 4 where the upper portion of the right wind deflector 12A is secured to the upper fairing 26 by a fastener that extends through opening 60 in the wind deflector.

Turning to FIGS. 1, 4, 5 and 6, it is seen that that the wind deflectors 12A and 12B occupy a significant area immediately adjacent the upper outboard sides of the forks 22 and 24. Further, the wind deflectors 12A and 12B extend upwardly to where they join the lower portion of the upper fairing 26. This results in the wind deflectors 12A and 12B extending from the lower edge or lower portion of the upper fairing 26 downwardly adjacent an outboard side of respective side covers and slide covers 25A and 25B so as to effectively close a significant or substantial area on the outboard side of the forks 22 and 24. Note that the wind deflectors 12A and 12B are fastened through the upper side covers on each side of the fork assembly. Note further that a lower portion of each wind deflector 12A or 12B projects downwardly along an outboard side of a respective slide cover 25A or 25B but that the wind deflectors in this embodiment are not actually secured to the slide covers. This effectively prevents air or oncoming wind from passing immediately adjacent the upper portions of the outboard sides of the forks 22 and 24 and thereafter passing underneath the lower edge of the upper fairing 26 and impacting the rider, especially in the chest, face and helmet areas. That is, because the wind deflectors 12A and 12B project outward from the forks 22 and 24 and extend upwardly to the upper fairing 26, a substantial area is covered by the wind deflectors. Because of their strategic placement, the wind deflectors are effective to deflect oncoming air or wind and cause the wind to bypass the rider.

At the same time the wind deflectors 12A and 12B are specifically designed not to impact or interfere with other structural elements of the motorcycle. Because of the strategic placement of the wind deflectors 12A and 12B and the fact that they are secured to the fork assembly and turn with the fork assembly, care must be taken in designing the wind deflectors such that the wind deflectors will clear and not impact or engage other components of the motorcycle. This is particularly true with respect to the lower fairing 28 and the crash bar 29. The outer terminal edge of each wind deflector 12A and 12B, especially in the lower area, is designed such that when the fork assembly and handlebars 20 are turned to an extreme position, the outer terminal edges of the wind deflectors will clear and pass by the lower fairing 28 and crash bar 29 without impacting or engaging the same.

The contours or design of the outer terminal edge 54 of each wind deflector will vary depending on the motorcycle make, model and year of manufacture. Again, all design elements of each wind deflectors 12A or 12B will be performed so as to yield a substantial effective air blocking potential while still having the attribute of being able to clear other motorcycle components when the handlebars 20 are turned to an extreme position.

The height or length of the respective wind deflectors can vary, depending on the amount of wind protection desired. The sculptured contour of each wind deflector tends to maximize the deflector frontal area and still allow the wind deflector to clear the crash guard 29 and lower fairings 28. As seen in the drawings, the wind deflectors are designed to fit tightly to the front forks 22 and 24 but still allow a clearance to prevent contact due to vibration or slight misalignment. It should be noted that in some cases the motorcycle 10 would not include the lower fairings 28 and in some cases the motorcycle 10 may not include the crash bar 29. In any event, the wind deflectors 12A and 12B still have utility inasmuch as they reduce the amount of oncoming air or wind that impacts the rider.

As discussed above, each wind deflector is designed and produced to fit tightly to the lower portion of the upper fairing 26 and the forks 22 and 24. By doing so, the wind deflectors 12A and 12B deflect the air that normally would pass under the upper fairing 26, over the lower fairings 28 if present, and onto the rider. Without the wind deflectors of the present invention, most of the air that is not deflected by the upper fairing 26 would hit the rider's chest, face and helmet. In order to maximize the amount of wind deflected or blocked with the wind deflectors 12A and 12B, it is advantageous for there to be a tight interface between the wind deflectors 12A and 12B and the motorcycle components. The strategic mounting of the wind deflectors to the right and left forks 22 and 24 and to the upper fairing 26 enables the wind deflectors 12A and 12B to deflect air that normally gets past standard fairing components.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A motorcycle comprising:
   a. a fork assembly including right and left forks with the right fork including a right slide cover and the left fork including a left slide cover;
   b. handlebars moveable between two extreme positions and operatively connected to the fork assembly such that the fork assembly turns as the handlebars are turned;
   c. an upper fairing mounted to an upper front portion of the motorcycle and rotatable with the handlebars and fork assembly, the upper fairing extending downwardly substantially below the handlebars;
   d. a lower fairing or crash bar disposed on each side of a lower front portion of the motorcycle;
   e. right and left wind deflectors mounted to the fork assembly for deflecting wind, each wind deflector comprising a single panel and projecting downwardly and forwardly relative to a front portion of the motorcycle and each wind deflector being generally aligned with the fork assembly;
   f. the right wind deflector extending downward from a lower edge of the upper fairing and closely adjacent an upper outboard side of the right fork such that the right wind deflector generally closes an area bounded by a portion of the lower edge of the upper fairing and an upper portion of an outboard side of the right fork;
   g. wherein the right wind deflector extends downwardly from the lower edge of the upper fairing to a point past at least one of the upper portion of the lower fairing and crash bar;
   h. the left wind deflector extending downward from a lower edge of the upper fairing and closely adjacent an upper outboard side of the left fork such that the left wind deflector generally closes an area bounded by a portion of the lower edge of the upper fairing and an upper portion of an outboard side of the left fork;
   i. wherein the left wind deflector extends downwardly from the lower edge of the upper fairing to a point past at least one of the upper portion of the lower fairing and crash bar; and
   j. each wind deflector including an outer terminal edge that is shaped relative to the lower fairing or crash bar such that when the handlebars are turned to either of the two extreme positions, the left or right wind deflector moves rearwardly past at least a portion of the adjacent lower fairing or crash bar.

2. The motorcycle of claim 1 wherein each wind deflector includes a main body that deflects wind and a mounting flange turned at an angle with respect to the main body; and wherein the mounting flange of each wind deflector is secured to the fork assembly.

3. The motorcycle of claim 2 including a cutout formed in the main body and the mounting flange through which extends a light support structure that supports at least one light.

4. The motorcycle of claim 1 wherein the outer terminal edge of each wind deflector includes a segment contoured to clear the crash bar of the motorcycle and a segment contoured to clear the lower fairing of the motorcycle.

5. The motorcycle of claim 3 wherein the mounting flange includes at least one fastener opening and wherein the mounting flange of each wind deflector is sandwiched between a side cover of the fork assembly and a bracket wherein at least one fastener extends through the bracket, through the mounting flange of the wind deflector and through the side cover.

6. The motorcycle of claim 1 wherein both the right and left wind deflectors are secured to both the fork assembly and the upper fairing.

7. The motorcycle of claim 2 wherein the mounting flange of each wind deflector includes at least two openings permitting a fastener to pass there through each and wherein each wind deflector further includes a third opening formed in an upper portion thereof for enabling a fastener to extend there through and connect to the upper fairing such that each wind deflector is connected by at least three fasteners including two fasteners that connect each wind deflector to the fork assembly and one fastener for connecting the wind deflector to the upper fairing.

8. A motorcycle comprising:
  a. a fork assembly including laterally spaced apart left and right forks;
  b. an upper fairing mounted to an upper front portion of the motorcycle,
  c. a left wind deflector mounted adjacent an outboard side of the left fork of the fork assembly and projecting outwardly from the left fork and downwardly adjacent an outboard side of the left fork so as to occupy an area immediately underneath the upper fairing and immediately adjacent the outboard side of the left fork;
  d. the left wind deflector projecting downwardly and forwardly relative to the motorcycle and extending in general parallel relationship with the fork assembly;
  e. a right wind deflector mounted adjacent an outboard side of the right fork and projecting outward from the right fork and downwardly adjacent the outboard side of the right fork so as to occupy an area immediately underneath the upper fairing and immediately adjacent the outboard side of the right fork;
  f. the right wind deflector projecting downwardly and forwardly relative to the motorcycle and extending in general parallel relationship with the fork assembly;
  g. wherein the left and right wind deflectors are configured and positioned on the motorcycle to reduce the amount of oncoming air from passing outwardly of the outboard sides of the left and right forks, underneath a lower edge of the upper fairing and impacting a rider on the motorcycle;
  h. each wind deflector comprising a main body and a mounting flange turned at an angle with respect to the main body; and
  i. wherein the mounting flange includes at least one fastener opening and wherein the mounting flange of each wind deflector is sandwiched between the fork assembly and a bracket and wherein at least one fastener extending through the bracket and through the mounting flange and into the fork assembly.

9. The motorcycle of claim 8 including:
handlebars operative to turn the fork assembly between two extreme positions; and
wherein each wind deflector includes an outer edge contoured to clear a lower fairing or crash bar forming a part of the motorcycle when the fork assembly assumes an extreme position.

10. The motorcycle of claim 8 wherein the main body of each wind deflector is at least slightly curve shaped.

11. The motorcycle of claim 8 wherein each wind deflector is also secured to the upper fairing.

12. The motorcycle of claim 8 wherein there is provided two fasteners for securing each wind deflector to the fork assembly of the motorcycle and wherein there is a third fastener that extends through each wind deflector and into the upper fairing such that each wind deflector is secured in place by three fasteners, two of which extend into the fork assembly and one of which extends into the upper fairing.

13. The motorcycle of claim 1 wherein each wind deflector includes a main body that deflects wind and a mounting flange turned at an angle with respect to the main body and wherein the mounting flange includes at least one fastener opening and wherein the mounting flange of each wind deflector is sandwiched between a side cover of the fork assembly and a bracket wherein at least one fastener extends through the bracket, through the mounting flange of the wind deflector, and through the side cover; and wherein the upper portion of each wind deflector at least slightly overlaps the lower portion of the upper fairing and wherein there is provided a fastener for connecting the upper portion of each wind deflector to the upper fairing such that each wind deflector is connected to both the upper fairing and the fork assembly.

* * * * *